United States Patent [19]
Beck et al.

[11] 4,119,767
[45] * Oct. 10, 1978

[54] SECONDARY BATTERY

[75] Inventors: Fritz Beck, Ludwigshafen; Rolf Wurmb, Heidelberg; Klaus Boehlke, Hessheim, all of Fed. Rep. of Germany

[73] Assignee: BASF Aktiengesellschaft, Ludwigshafen am Rhein, Fed. Rep. of Germany

[*] Notice: The portion of the term of this patent subsequent to May 30, 1995, has been disclaimed.

[21] Appl. No.: 783,700

[22] Filed: Apr. 1, 1977

[30] Foreign Application Priority Data

Apr. 30, 1976 [DE] Fed. Rep. of Germany ....... 2619147

[51] Int. Cl.$^2$ ............................................ H01M 10/00
[52] U.S. Cl. ..................................... 429/105; 429/106
[58] Field of Search ................. 429/105, 106, 107, 19, 429/27, 29, 188, 218

[56] References Cited

U.S. PATENT DOCUMENTS 3,540,933  11/1970  Boeke ............................. 429/105 X Primary Examiner—Anthony Skapars
Attorney, Agent, or Firm—Keil, Thompson & Shurtleff

[57] ABSTRACT

In a secondary battery employing an aqueous lead salt solution as the electrolyte, salts of manganese, cobalt, nickel, copper, thallium, bismuth and/or antimony are additionally present in concentrations of from 0.1 to 100 mmole/l.

3 Claims, 6 Drawing Figures

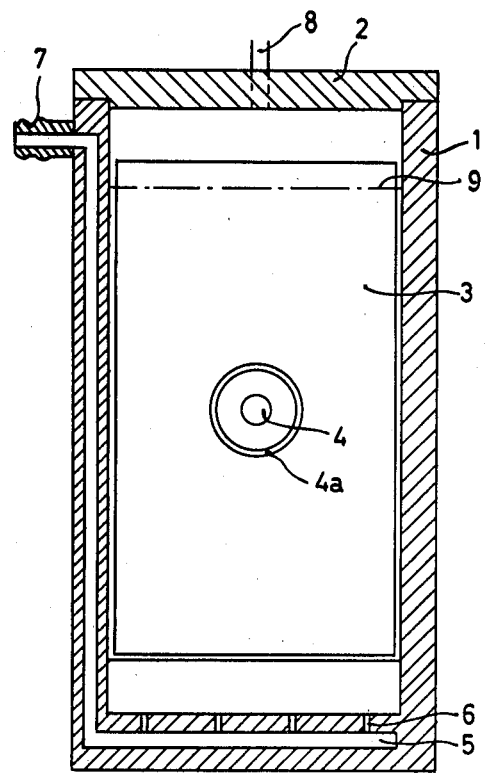

SECONDARY BATTERY

It is known that the use of dissolved-state electrodes (electrodes of the 1st kind, i.e. electrodes in which the active material is converted into compounds soluble in the particular electrolyte) in secondary batteries should lead to the following advantages over electrodes of the 2nd kind, conventionally used in aqueous systems, i.e. electrodes in which the active material is converted into compounds insoluble in the electrolyte:

Increased energy density by greater conversion of the active materials.

Increased output density resulting from a higher effective current density.

Improved low-temperature behavior.

Greater ease of regeneration and of deposition of the active materials.

Hitherto, the realization of these advantages encountered a range of problems specific to the particular system, which can be classified under two categories. One category of problems results from transport problems. During each charging operation, the active material must be transported from within the solution to the surface of the electrode base plate. On the other hand, during each discharge the deposited layers must be completely redissolved. Maintaining adequate convection in the electrolyte is thus very important with this type of battery. If the convection is inadequate, the following problems arise:

1. Local problems: formation of dendrites and nodules on the surface of the electrode.
2. Asymmetrical deposition of the active materials along the electrode surface (shape change).
3. Asymmetrical deposition of the active materials in respect of the counter-electrode, especially in the case of a lead dissolved-state secondary battery.

Further problems result from the partially irreversible behavior of the active deposits. As a result of the asymmetry between current efficiencies for deposition and/or dissolution, and as a result of asymmetry in respect of corrosion processes, the active deposits show a partially irreversible behavior. This results in the accumulation of one or — due to coupling of the two electrode processes — both active coatings on the electrode base plates.

Thus it is known, for example, that whilst in lead dissolved-state secondary batteries the lead electrode exhibits virtually ideal behavior, the lead dioxide electrode exhibits irreversible phenomena, especially during discharge. The phenomena in question are presented in a recent article (Ber. Bunsenges. 79, 233 (1975)). This partial irreversibility of the $PbO_2$ electrode is troublesome, above all, on frequent cycling of a lead cell, i.e. interferes with the long-term behavior of the cell. At the end of the discharge phase, a residual oxide is left on the positive electrode base plate. The incomplete reduction of the $PbO_2$ layer also causes the oxide to slough off during the discharge period. The oxide particles which accumulate on the bottom of the cell are of course also incapable of further cycling. In addition, the lead dioxide appears to corrode increasingly in the acid under cathodic load. All three effects together result in a loss in current efficiency, which manifests itself in an amount of residual lead, equivalent thereto, on the negative electrode base plate. According to this mechanism, a certain proportion of the lead ions is abstracted from the system, during each cycle, as far as the formation of the active material is concerned, so that the number of achievable cycles is relatively low. A secondary battery, based on this system, which permits a large number of cycles, is therefore only achievable if it proves possible substantially to repress these irreversible phenomena, which start from the lead dioxide.

According to one of our proposals, U.S. patent application Ser. No. 703,957, these disadvantages can be avoided if the electrolyte contains redox systems which have a standard potential of from $-0.1$ to $+1.4$ V relative to a standard hydrogen reference electrode, with the proviso that the redox systems do not form insoluble compounds with the electrolyte and are not oxidized or reduced irreversibly by the active materials within their range of operating potentials.

However, when cycling thick layers and/or on complete charge, the above difficulties arise even in such cases, though to a lesser degree.

It is an object of the present invention to provide a secondary battery with aqueous acid solutions of lead salts as electrolytes and inert electrode base plates for the active materials, which does not exhibit these disadvantages.

We have found that this object is achieved if the electrolyte additionally contains salts of manganese, cobalt, nickel, copper, thallium, bismuth and/or antimony in concentrations of from 0.1 to 100 mmole/l.

The additives according to the invention are incorporated into the deposited lead dioxide when charging the secondary battery. Copper, bismuth and antimony additionally undergo cementation on the negative electrode. The additives deposited in this way redissolve, together with the lead or the lead dioxide, on discharge during each cycle. Their action is probably attributable, firstly, to hardening of the lead dioxide layer, which in this way undergoes much less corrosion and virtually no longer sloughs off, and, secondly, to the fact that the lead on the negative electrode is so greatly activated that after discharge any residual layers of lead can dissolve in the acid electrolyte. Surprisingly, we have found that it is not only the cations of copper, bismuth and antimony, which are cementable according to their position in the electromechanical series, which prove active, but that the elements cobalt, nickel and thallium, which are more negative than lead, are also active. The removal of the residual lead layers can be speeded up by reversing the poles of the secondary battery after discharge. With normal current densities of from 0.1 to 5 $A/dm^2$, the residual lead deposits completely uniformly on the counterelectrode if the additives according to the invention are present, and can subsequently again be detached easily by corrosion.

The additives according to the invention are added to the electrolyte in the form of their salts, the anion of which preferably corresponds to the anion already present in the electrolyte. Preferably, the electrolyte should contain from 1 to 10 mmoles/l of the stated additives. The latter may be used individually or as mixtures.

Suitable materials for the positive electrode base plates are, in addition to titanium, above all graphite, electrode carbon and graphite-filled plastics, i.e. graphite particles embedded in binders which are resistant to the electrolyte. Examples of suitable binders are polypropylene, polyethylene and polyvinyl chloride. The degree of filling of the binder advantageously corresponds to from 50 to 80% by weight of graphite. If electrode base plates of graphite-filled plastic are used, natural graphite, e.g. natural graphite flakes having a particle size of from 0.1 to 0.2 mm and an iron content of about 1% by weight may advantageously be used.

The remaining parameters do not differ from the parameters which conventionally apply to lead dissolved-state secondary batteries. Accordingly, preferred lead salt solutions are aqueous solutions of lead tetrafluoborate, lead hexafluosilicate, lead perchlorate or lead amidosulfonate, employed individually or as mixtures. As a rule, an excess of up to 100 mole% of free acid is present (in the discharged state). The salt concentrations are from 20% by weight up to the saturation concentration. Negative electrode base plates which may be used are the graphite materials described above, as well as acid-resistant metals, e.g. copper, Monel metal, nickel alloys with molybdenum, chromium, manganese, copper, silicon and/or iron as other components of the alloy, or acid-resistant steels containing chromium, nickel and molybdenum. In general, the electrodes have a smooth surface. To give better adhesion of the active materials, especially of the $PbO_2$, it is however advantageous if the plates present a structured surface, e.g. possess milled ridges or pyramids, or consist of expanded metal or grids, or are sand-blasted. The electrodes may be monopolar or, advantageously, bipolar. It is advantageous to circulate the electrolyte, e.g. by stirring or pumping, during charge and/or discharge.

The electrolytes may in addition contain dissolved redox systems which have a standard potential of from $-0.1$ to $+1.4$ V relative to a standard hydrogen reference electrode, with the proviso that the redox systems do not form insoluble compounds with the electrolyte and are not oxidized or reduced irreversibly by the active material within their range of operating potentials.

Some particularly suitable redox systems, and their standard potentials, are shown in the Table which follows:

| | |
|---|---|
| $V^{+++}/VO^{++}$ | (+0.36 V) |
| durohydroquinone/duroquinone | (+0.48 V) |
| $U^{+++}/UO_2^{++}$ | (+0.62 V) |
| hydroquinone/quinone | (+0.70 V) |
| $Fe^{++}/Fe^{+++}$ | (+0.77 V) |
| $NO_3^-/NO_2^-$ | (+0.94 V) |

Vanadium, uranium and iron are advantageously added to the electrolyte in the form of salts, whereof the anion corresponds to the anion of the lead salt contained in the electrolyte. Nitrate/nitrite is advantageously added to the electrolyte in the form of sodium nitrite or $HNO_3$. The $Fe^{++}/Fe^{+++}$ redox system is particularly preferred.

It generally suffices to add one redox component, preferably the reduced form, to the solution, since a stationary state redox ratio is soon set up during operation of the secondary battery.

The concentration of the redox components should in general be kept low in order to limit the losses in current efficiency, and is from 0.1 to 100 mmoles/l, preferably from 1 to 30 mmoles/l. The conversion of the lead salt solution is from 10 to 99%. Preferably, the battery is charged fully, corresponding to a conversion of from 95 to 99%. The final charge voltage is from 2.4 to 2.8 V. Preferably, the battery is discharged down to 0.7 volt. The current densities during charge and discharge are from 0.1 to 25 A/dm², preferably from 0.5 to 5 A/dm².

The specific charge per unit area is from 0.1 to 10 Ah/dm², preferably from 1 to 6 Ah/dm².

EXAMPLE 1

Figure 1:
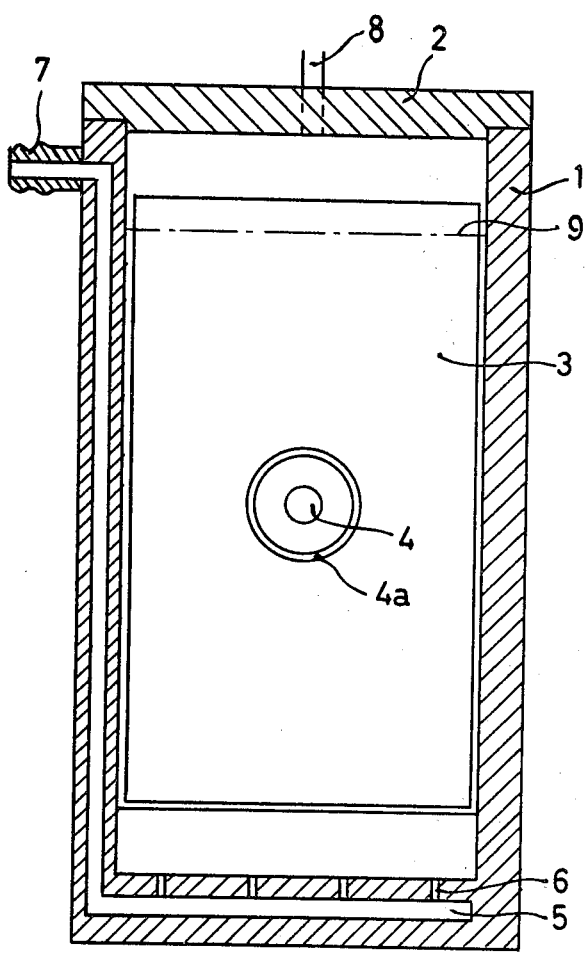
FIG. 1 is a section view, taken on a vertical section plane, of an embodiment of a battery of the invention.
Figure 1A:
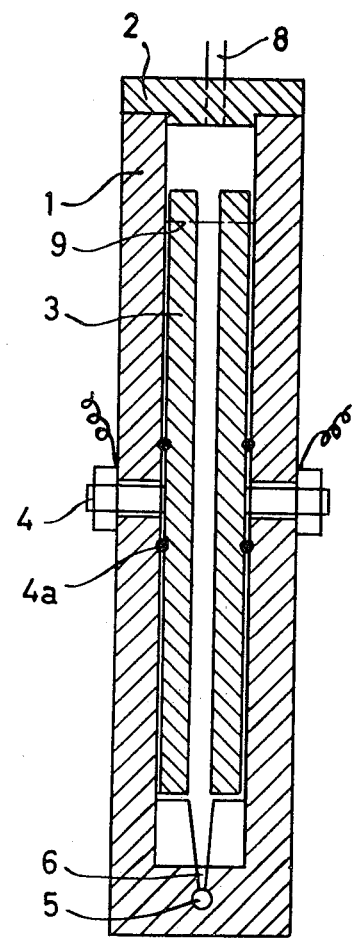
FIG. 1a is another vertical section thereof taken on a section plane 90° displaced from the section plane of FIG. 1.

The cell 1 and lid 2 shown in FIG. 1 consist of polymethyl methacrylate. The rectangular electrodes 3 are provided, at their center, with contacts 4 which lead out through the rear wall and are sealed by means of O-rings 4a. The channel 5 opens into the electrolyte chamber through bores 6 and is provided with a connection at 7. 8 is a vent. The electrolyte is introduced until the level reaches 9.

The electrodes have a surface area of 1 dm² (80 × 125 mm) on each side and consist of graphite-filled polypropylene (80% by weight of natural graphite flakes having a particle size distribution, according to DIN 4,188, corresponding to at least 70% retention on an 0.16 mm sieve, and 20% of polypropylene). They carry a 1 mm brass insert joined to the contact 4. The clearance between the electrodes and the bottom is 10 mm. The composite electrodes are produced in a heated press at 190° C under 10 bars pressure. The distance between the electrodes is 6 mm.

The cell is filled with 70 ml of a solution which contains 2 moles/l of $Pb(BF_4)_2$ and 1 mole/l of $HBF_4$. The solution further contains the following additives:

A. 10 mmoles/l of $Bi(BF_4)_3$, 5 mmoles/l of $TlBF_4$ and 1.7 mmoles/l of $Fe(BF_4)_2$ B. 40 mmoles/l of $Co(BF_4)_2$, 10 mmoles/l of $Fe(BF_4)_2$ and 8 mmoles/l of $Cu(BF_4)_2$ C. 1.7 mmoles/l of $Fe(BF_4)_2$ (comparative experiment)

The electrolyte level 9 is caused to pulsate at a frequency of 0.5 c/s and an amplitude of 2 mm by pulsating introduction of electrolyte solution at 7. In addition, one air bubble per 2 seconds is passed through the solution by means of a small membrane pump (not shown).

The charging current density is 2.4 A/dm² and the discharging current density is 1.2 A/dm². The mean charge voltage is 2.1 volts whilst the almost horizontal discharge curve shows a mean discharge voltage of 1.65 volt. The battery is charged until the voltage has risen to 2.6 V and is discharged to a final voltage of 0.7 V. After each cycle, the cell is left currentless for 3 hours, with the pulsation continuing.

During charge, the lead deposits as a very smooth layer (A: dark grey, B: whitish grey). The positive electrode is also covered, with a very smooth layer of $PbO_2$. Sloughing of $PbO_2$ is very slight in cases A and B, but noticeable in the case of C. For a theoretical amount of current charged of 3.75 Ah/dm$^2$, the following average values are observed over the first 30 cycles:

|  | A | B | C |
|---|---|---|---|
| Amount of current charged $Q_L$[Ah/dm$^2$] | 3.6 | 4.2 | 3.4 .... 1.0 |
| Current efficiency (%) | 80 | 68 | 75 |

Figure 2:
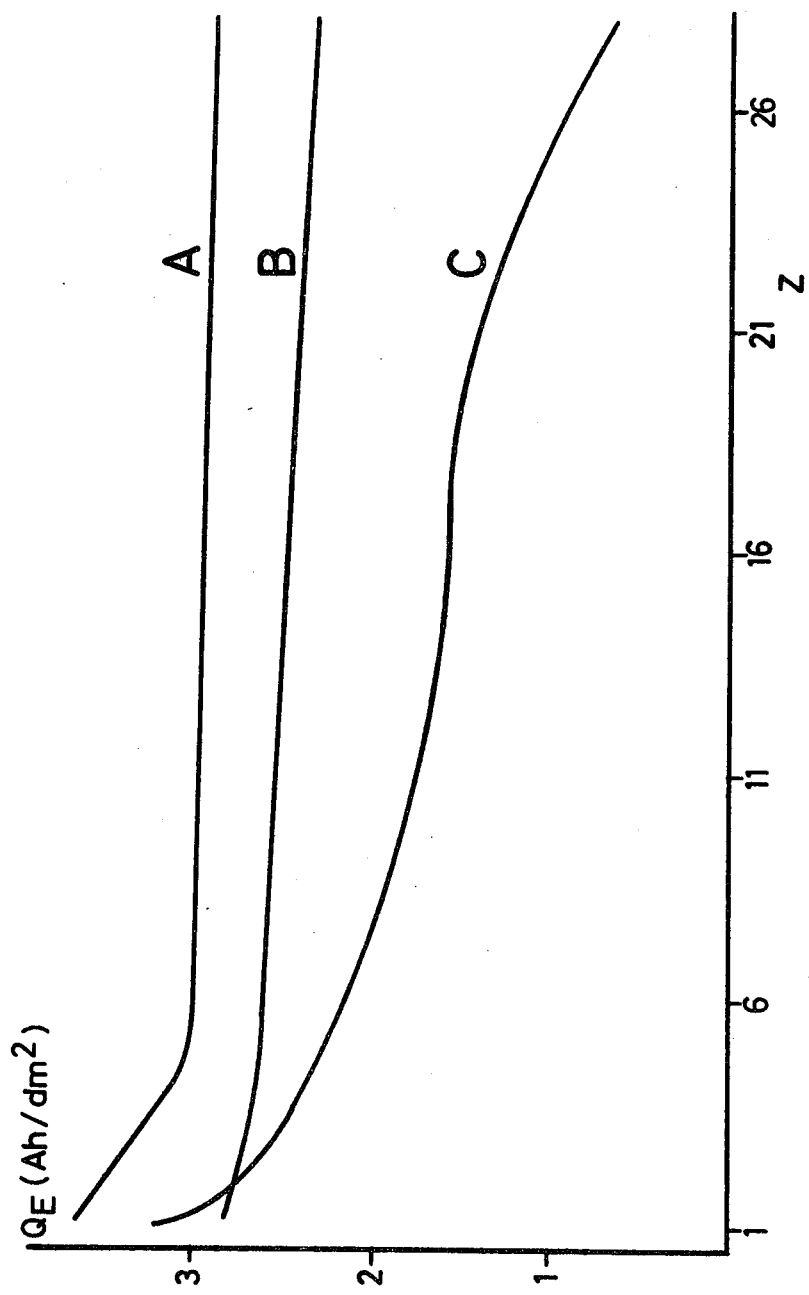
FIG. 2 is a graph of mean current discharge $Q_E$ over the indicated number of charge/discharge cycles Z for batteries with electrolyte compositions A, B and C in Example 1.

Whilst in the case of A and B the amount of current discharged, $Q_E$, only decreases slightly over the first 30 cycles and remains at a high level of 2.5–3 Ah/dm$^2$ (compare FIG. 2), a continuous fall, down to about 1 Ah/dm$^2$, is found in Comparative Experiment C. In the case of A and B, no residual deposits are formed on the electrode base plate; in contrast, in the case of C, a substantial amount of residual lead has accumulated on the negative electrode after 30 cycles.

EXAMPLE 2

70 ml of a solution of the following composition are introduced into the cell, comprising graphite-filled polypropylene electrodes, which has been described in Example 1: 2 mmoles/l of Pb(BF$_4$)$_2$, 1 mole/l of HBF$_4$, 40 mmoles/l of Ni(BF$_4$)$_2$ and 10 mmoles/l of Fe(BF$_4$)$_2$.

A swarm of air bubbles is driven, at intervals of 3–4 seconds, via the channel 5 and the orifices 6 (FIG. 1) through the electrolyte, by means of a pneumatic pulse generator. The remaining conditions are as described in the preceding example, except that the pause between cycles is extended to 4 hours.

The Table which follows shows some values of $Q_L$, $Q_E$ and current efficiency $Q_E/Q_L$ as a function of the number of cycles Z.

| Z | $^+Q_L$ [Ah/dm$^2$] | $Q_E$ [Ah/dm$^2$] | Current efficiency (%) |
|---|---|---|---|
| 1 | 4.2 | 2.2 | 53 |
| 3 | 3.6 | 2.3 | 65 |
| 10 | 3.5 | 2.3 | 67 |
| 20 | 3.0 | 2.1 | 70 |
| 40 | 3.4 | 2.25 | 67 |
| 70 | 3.2 | 2.1 | 65 |
| 100 | 3.3 | 1.8 | 55 |
| 150 | 3.6 | 2.0 | 56 |
| 200 | 3.4 | 2.0 | 59 |
| 300 | 3.5 | 1.9 | 54 |

+Theoretical value 3.75 Ah/dm$^2$

Figure 3:
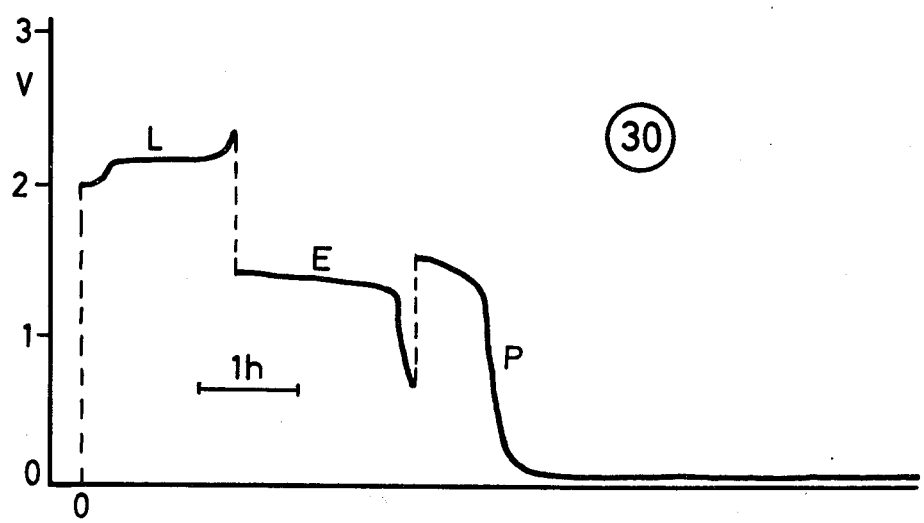
FIG. 3 is a graph showing the mean charge and discharge voltages of the battery of Example 2 in the 30th charge/discharge cycle.

In the pause between cycles, an off-load voltage of 1.8 V is set up after the first cycle, but soon declines, after a brief stabilization at 0.8 V, to 0, (compare the example of the 30th cycle given in FIG. 3). This pattern is indicative of complete detachment of the residual layers from both electrodes; accordingly, the new cycle starts with "bright" electrode base plates.

EXAMPLE 3

The cell describes in Example 1 A is fully charged under the conditions stated in Example 1 A, except that from the 4th cycle onward the discharge at the rate of 1.2 A/dm$^2$ is restricted to two hours ($Q_E$ = 2.4 Ah/dm$^2$). It is possible to cycle the battery, without problems, even with this partial discharge. The mean amount of current charged is 3 Ah, which corresponds to a current efficiency of 80%. The residual oxide layer remaining on the positive electrode proves to be resistant to sloughing.

EXAMPLE 4

50 ml of a solution of the following composition are introduced into the cell described in Example 1 (distance between electrodes 3–4 mm):

D.
1.5 mmoles/l of Pb(BF$_4$)$_2$
1.0 mole/l of HBF$_4$
4 mmoles/l of Bi(BF$_4$)$_2$
4 mmoles/l of Tl(BF$_4$)$_2$
1.5 mmoles/l of Fe$^{++}$
E. as for D, but without added Bi$^{+++}$ and Tl$^+$ (Comparative Experiment)

Convection is effected as in Example 1. The current densities are in each case 0.75 A/dm$^2$. The pause between cycles is 1 hour. In each cycle, the battery is completely charged (final voltage 2.5 V) and is discharged to a low value.

Figure 4:
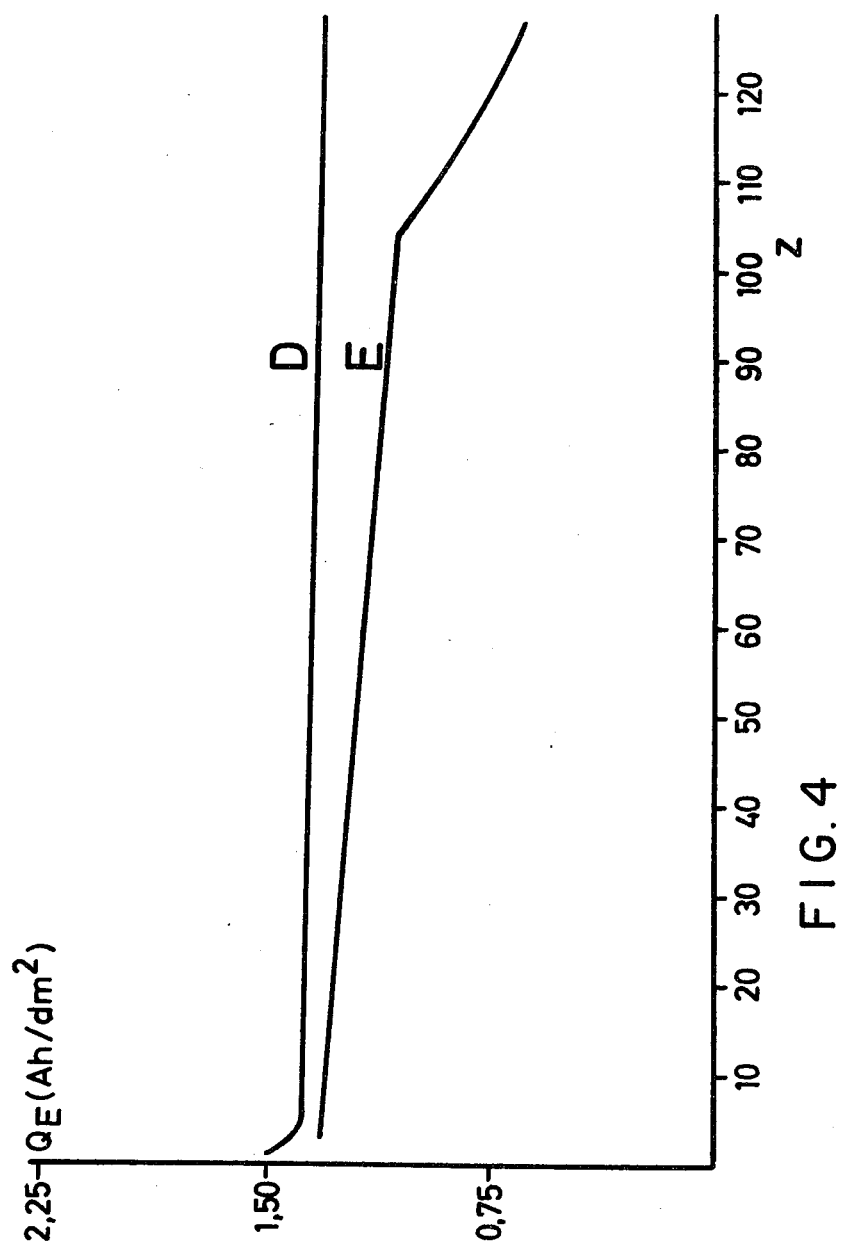
FIG. 4 is a graph like FIG. 2 for batteries with the electrolyte solutions D and E of Example 3.
Figure 5:
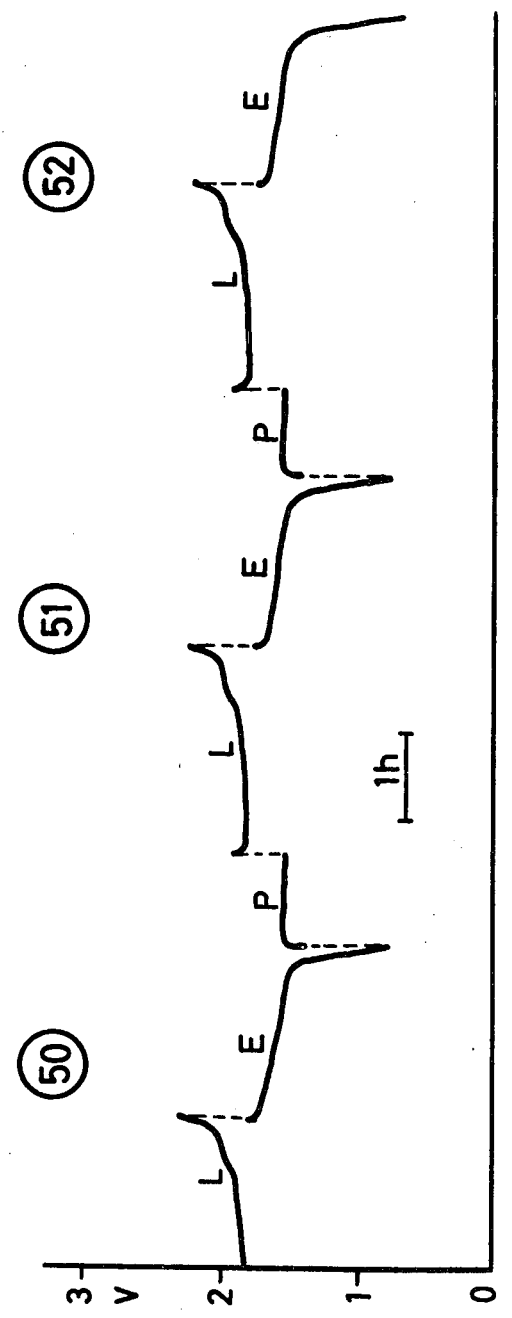
FIG. 5 is a graph like FIG. 3 for cycles 50, 51 and 52 of the battery of Example 4.

As may be seen from FIG. 4, in the case of D the amount of current discharged, $Q_E$, remains at a high level (70% of the theoretical value of 2.0 Ah/dm$^2$), whilst in the case of E even the initial value is lower, and continues to decrease steadily. Compared to Example 1, the layers are thinner and give better cycling. The current efficiency for D is from 70 to 80%; it is true that in the case of Comparative Experiment E it is initially higher, being 90%, but then falls steadily to 60%. The mean charge voltages and discharge voltages are, according to FIG. 5 (shown for the 50th to 52nd cycle) 1.9 and 1.65 volt respectively, and are accordingly very advantageous; as a result, the Wh efficiency is as much as 70%.

We claim:

1. A secondary battery with aqueous solutions of lead salts as electrolytes and inert electrode base plates for the active materials, wherein the electrolyte additionally contains from 0.1 to 100 mmoles/l of salts of manganese, cobalt, nickel, copper, thallium, bismuth and/or antimony.

2. A secondary battery as set forth in claim 1, wherein the anions of the salts of manganese, cobalt, nickel, copper, thallium, bismuth and/or antimony correspond to the anion of the lead salt.

3. A secondary battery as set forth in claim 1, wherein the electrolyte additionally contains dissolved redox systems which have a standard potential of from −0.1 to +1.4 V relative to a standard hydrogen reference electrode, which redox systems do not form insoluble compounds with the electrolyte and are not oxidized or reduced irreversibly by the active materials within their range of operating potentials.

* * * * *